Patented Nov. 1, 1949

2,487,036

UNITED STATES PATENT OFFICE 2,487,036

CONTROLLED-CONSISTENCY GYPSUM PLASTERS AND METHOD AND MATERIALS FOR PRODUCING THE SAME

John K. Wise, Evanston, Ill., assignor to United States Gypsum Company, Chicago, Ill., a corporation of Illinois No Drawing. Application March 26, 1948, Serial No. 17,384

4 Claims. (Cl. 260—17.3)

The present invention relates to gypsum plasters and plaster products during the manufacture of which the gauged plaster has a predetermined and controllable consistency and also deals with materials for effecting these results, and with methods for producing these substances.

It has long been known that calcined gypsum plasters, when mixed with water will re-combine therewith and will set up to produce finished articles generally known as gypsum castings. Such castings, however, have certain deficiencies, primarily their lack of density and strength.

Many methods have been proposed in the past to overcome these difficulties, some of the methods involving the addition of various set controlling and consistency controlling chemicals, while others have attempted to solve the problem by merely moistening the gypsum with sufficient water to cause it to set followed by physical compression of the dampened calcined gypsum powder so that a dense product would result.

Still other methods have involved the impregnation of finished gypsum castings by various impregnating materials such as resins, sulfur and the like, in an attempt to fill the interstices of the gypsum castings with reinforcing materials.

Thus it has long been known that the addition of certain gums, carbohydrates, etc., to ordinary gypsum plasters, that is to say, various forms of partially dehydrated gypsum such as the hemihydrate and the soluble anhydrites, will confer marked improvements to gypsum products containing them. Gelatinized starch had been found to be particularly advantageous in this respect as admixtures thereof with plaster showed considerably increased strength as compared with neat plaster casts of the same apparent density. However, this expedient carries with it certain other defects, particularly because the incorporation of gelatinized starch into the gauging water made it necessary to use considerably greater quantities thereof as compared with ordinary water. Expressed in another way, this meant that the so-called "consistency" of the plaster was considerably increased, with the concomitant result that the finished product was of less density than desired, because the evaporation of the excess water quite expectedly left voids behind which correspond to the space the water had occupied.

One particular method which attempts to overcome this difficulty is described in the patent to Hoggatt 2,388,543, who proposes to admix raw or ungelatinized starch with a calcined gypsum plaster, and then to cast the resulting slurry into the desired shape; after the plaster has set he proposes to heat the material while still undried to a temperature sufficiently high to effect the gelatinization of the starch; by this method Hoggatt is able to prepare a plaster cast reinforced with starch, but having a higher density and consequently a higher strength than was possible by the use of pre-gelatinized starch. This method, however, is subject to certain serious practical disadvantages. In the first place, the heat required to gelatinize the starch in the casting tends partially to re-calcine the same, therefore impairing its strength.

Hoggatt suggests therefore that the heating of the casts be accomplished either in water or at least in water vapor to prevent such re-calcination. Thus, however, by reason of the solubility of calcium sulfate in water, quite naturally leaches some of it from the casting, and therefore destroys the sharpness of reproduction of the mold details. Moreover, the process is only applicable to comparatively small castings such as are portable and can be placed in a suitable container or oven.

It will therefore be appreciated by those familiar with the plaster castings industry, that any process, which enables the production of a casting of enhanced strength and containing certain quantities of starch without simultaneous increase in the consistency of the mixture, will have many commercial advantages. This is particularly true if the consistency can be predetermined and controlled.

The present invention aims to accomplish just this.

It is therefore an object of the present invention to provide calcined gypsum plasters and set cast gypsum plaster products which are reinforced with starch but in which the calcined gypsum plaster mixtures are characterized by a controlled and reproducible consistency which may be varied over a wide range.

It is a further object of the present inevntion to provide such castings by a process wherein the heating of the finished castings will not be required.

It is a further object of the present invention to provide calcined gypsum mixtures containing certain raw starch derivatives or co-condensation products which lend themselves particularly to the practice of the present invention.

It is a further object of the present invention to provide a process for producing certain co-condensation products of starch, urea, and formaldehyde.

Other objects of the present invention will become apparent from the ensuing description of the invention and from the hereunto appended claims.

I have discovered that the above and other desirable objects may be achieved by heating certain farinaceous materials such as the various forms of starch and dextrins in the presence of both urea and formaldehyde prior to admixture of the resulting reaction products with calcined gypsum plasters. The invention is applicable to any suitable type of calcined gypsum, but has found its best application to a calcined gypsum product which already has an inherently low consistency, such for example as the so-called "alpha gypsum" produced in accordance with the Patent No. 1,901,051 to Randel and Dailey. Furthermore, the invention will be described primarily in connection with an acid-hydrolized corn starch having a fluidity of 75, but it will be obvious that the general principles disclosed are equally applicable to other plasters and other starches; such for example as ordinary so-called stucco and oxidized starches, as well as various form of dextrins. Examples of all of these will be given hereinafter.

In examples which are about to be described, the term "fluidity" as applied to the starch, has reference to the viscosity of a starch solution, such for example as has been described on page 95 of Kerr's "Chemistry and Industry of Starch," published in 1944 by Academic Press, Inc. The test method employed for determining the fluidity of such starch is quoted from the said publication as follows:

"5 grams of starch, dry weight basis, are wet with 10 cc. of distilled water, in a Pyrex beaker. at 25° C., 90 cc. of a 1% solution of sodium hydroxide are added, with stirring, and the stirring is continued for 3 minutes from the time the sodium hydroxide is poured in. The mixture is allowed to stand 27 minutes more at 25° C. At this time the contents are poured into a standardized glass funnel with a special tip and the quantity of starch solution which runs from the funnel in 70 sec. at 25° C. is noted. This amount, measured in cubic centimeters, is taken as the fluidity; . . ."

Therefore, without intending to limit the present invention in any way, the following examples are given:

*Example I*

| | | |
|---|---|---|
| 75 fluidity starch | grams | 75 |
| Water | do | 700 |
| Urea | do | 12.5 |
| Formalin (containing 37% actual formaldehyde) | milliliters | 62.5 |

The above ingredients were mixed and the hydrogen-ion concentration of the mixture adjusted to pH 5.4, this being done either by means of a solution of sodium hydroxide or of acetic acid, depending upon circumstances. In other words, if the batch was too acid, it would be neutralized by the said alkali, and if it was insufficiently acid, it would be acidified by the acetic acid. Once the desired hydrogen-ion concentration had been established, the resulting mixture or batch was then heated to about 85° C., and held within the range of from about 85° C. to about 90° C. for about one hour, whereafter the hydrogen-ion concentration was adjusted to a pH of 6.8 and the heating continued for about another hour. This completed the preparation of what, for the sake of simplicity, is hereinafter termed the "additive," and which may be considered as either the reaction product of the ingredients or as a co-condensation product of starch, urea, and formaldehyde. Its exact nature is not known, but the product in any event is an aqueous solution. The calculated solids content of the solution, prepared as just described, is about 11.75%. It is desirable to cool the material down to about room temperature before attempting to use it.

The material was used as follows:

95 grams of "alpha gypsum" plaster was mixed with sufficient of the above product to yield 5 grams of solids. The resulting mixture was found to have a consistency of 37.6 (expressed as milliliters of water to give a pourable mix with 100 grams of solids). For purposes of comparison the consistency of the above amount of untreated starch merely boiled with water and then mixed with the alpha gypsum was 74 when using 5% of starch, and 99 when using 10% of starch.

It will thus be seen that heating the starch for the indicated period with both urea and formaldehyde yielded a product which did not produce a mixture with the alpha gypsum having as high a consistency as when untreated starch had been used. The original consistency of the alpha gypsum used in this example was 42. The term "consistency" in this connection is well understood in the industry and is predicated upon the amount of water required in milliliters with 100 grams of a given plaster to produce a mixture which is of such fluidity that it can just be poured from a cup.

*Example II*

| | | |
|---|---|---|
| 75 fluidity starch | grams | 105 |
| Urea | do | 17.5 |
| Formalin (containing 37% actual formaldehyde) | ml | 87.5 |
| Water | grams | 583 |

A batch made up as thus constituted was cooked in the same fashion as that of Example I. This batch, used with the same alpha gypsum of Example I, had a consistency of 51.5 at 5% of solids, and 79.2 at 10%. By reciting the amount of solids, I means thereby to imply that enough of the liquid mixture resulting from the cooking was used to supply 5% of solids. Inasmuch as the calculated total solids content of the cooked batch in Example II was 17.5%, this can readily be calculated.

The present example illustrates the differences in results which are attainable by changes in the relative amounts of the materials used.

*Example III*

| | | |
|---|---|---|
| 75 fluidity starch | grams | 105 |
| Urea | do | 17.5 |
| Formalin (containing 37% actual formaldehyde) | ml | 87.5 |
| Water | grams | 483 |
| Calculated solids content | per cent | 20 |

It will be noticed that the relative proportions of starch, urea and formaldehyde in this case are the same as in Example II, except that less water was used. Also, in Example III, the batch was first heated for one-half hour within the temperature range of 85 to 90° C. at a pH of 5.3, and then for one and one-half hours at a pH of 7.2. This product when tested with the aforementioned alpha gypsum showed a consistency of 48 at 5% and 53 at 10% as compared with consistency of 74 and 99.0 for untreated starches at the same percentages of solids.

Example IV

| | | |
|---|---|---|
| 75 fluidity starch | grams | 105 |
| Urea | do | 17.5 |
| Formalin (containing 37% actual formaldehyde) | ml | 87.5 |
| Water | grams | 483 |
| Calculated solids content | per cent | 20 |

This example was exactly like Example III except for the hydrogen-ion concentration and heating temperatures. In this case therefore the batch was first heated for 15 minutes, within the temperature range of 85° to 90° C. at pH of 5.0, and then for 1¾ hours at a pH of 6.8. The product showed consistency when used with alpha gypsum of 35 at 5% and 40 at 10%. In other words, under the cooking conditions of Example IV, a product was obtained which produced a plaster mixture of still lower consistency.

A larger batch of this same formula was cast with plaster at 53 ml. of water per 100 grams of total solids of which 7.5 represented the starch additive.

Casts made from this when dried were found to have a tensile strength of 677 pounds per square inch, and a compressive strength of 4920 pounds per square inch.

For comparison neat plaster casts made from the same plaster and adjusted to the same density of cast showed a tensile strength of only 455 pounds per square inch and a compressive strength of only 3620 pounds per square inch.

Example V

This example illustrates the effects obtained by changing the relative proportions of starch to urea and formaldehyde.

| | | |
|---|---|---|
| 75 fluidity starch | grams | 90 |
| Urea | do | 5 |
| Formalin (containing 37% actual formaldehyde) | ml | 25 |
| Water | grams | 378 |
| Calculated solids content | per cent | 20 |

This batch was heated for 15 minutes at 85° to 90° C. at a pH of 5.3, whereafter the pH was adjusted to 8.36, and the heating was continued for 1¾ hours. This batch showed consistencies when tested with the same alpha gypsum plaster of 50 at 5% and 60 at 10%. The percent here again has reference to the solids content of the additive.

Example VI

This example has the same composition as Example V except that the heating was as follows:

The material was heated at 85° to 90° C. for fifteen minutes at a pH of 5.32 whereafter it was neutralized and allowed to cool. In other words, it did not receive a second heating at an increased pH (lower acidity).

The product thus prepared when tested with the same alpha gypsum showed a consistency of 44 at 5% additive and 46 at 10% additive.

Example VII

This example shows the effect of the reduction of the formaldehyde from the quantities shown in Examples V and VI. The formula used was as follows:

| | | |
|---|---|---|
| 75 fluidity starch | grams | 90 |
| Urea | do | 5 |
| Formalin (containing 37% actual formaldehyde) | ml | 12.5 |
| Water | grams | 391.5 |

This batch was prepared in exactly the same manner as has been described in Example VI. It showed consistencies with the same alpha gypsum of 54 at 5% additive and 62 at 10% additive.

In the examples to follow, oxidized starch and dextrins are used, plus one example with 75 fluidity starch, but applied to ordinary kettle stucco instead of the alpha gypsum.

Example VIII

| | | |
|---|---|---|
| Oxidized starch | grams | 120 |
| Urea | do | 40 |
| Formalin (containing 37% actual formaldehyde) | ml | 120 |
| Water | grams | 376.8 |

This material was heated for 75 minutes at a temperature within the range of 85° to 90° C., with a hydrogen-ion concentration corresponding to a pH between 7 and 8.

The calculated percent of solids was 30%; starch to urea formaldehyde resin ratio, 60:40; and formaldehyde to urea molar ratio 2.5:1. This product, when tested with 5% additive with the same alpha gypsum as before, showed a consistency of 41, but with 10% additive, the consistency had dropped to 36.

This compared with a normal consistency of the alpha gypsum of 42.

Example IX

| | | |
|---|---|---|
| Oxidized starch | grams | 97.5 |
| Urea | do | 26.2 |
| Formalin (containing 37% actual formaldehyde) | ml | 115 |
| Water | grams | 352 |

This product was prepared by heating it for 75 minutes within a temperature range of from 85° to 90° C. at a pH of from 7.5 to 8. Calculated solids was 25%. The starch to urea-formaldehyde resin ratio equals 65:35, and the molar ratio of formaldehyde to urea equals 3.5:1; consistency at 5% additive was 40.5, and at 10% was 35.

Example X

| | | |
|---|---|---|
| Dextrin | grams | 88 |
| Urea | do | 36 |
| Formalin (containing 37% actual formaldehyde) | ml | 180 |
| Water | grams | 162 |

This material was heated at a temperature of 85° to 90° C., for a period of 75 minutes, at a pH between 6.5 and 7. The calculated solids content was 33⅓%; the dextrin to urea-formaldehyde resin ratio was 55:45; the molar ratio of formaldehyde to urea was 4:1. The consistency of this product with the same alpha gypsum at 5% additive, was 35, and at 10% additive, 31.

Example XI

| | | |
|---|---|---|
| Dextrin | grams | 88 |
| Urea | do | 36 |
| Formalin (containing 37% actual formaldehyde) | ml | 180 |
| Water | grams | 162 |

The above materials were heated for 30 minutes at a pH of 5 to 5.5, at 85° to 90° C., whereafter the pH was adjusted to 7, and the product further heated at the same temperature for another 30 minutes.

The calculated solids content was 33⅓%. The starch to resin and formaldehyde to urea ratios are of course the same as in Example X. The consistency produced by this product with the same alpha gypsum at 10% additive was 33.

Example XII

| | | |
|---|---|---|
| 75 fluidity starch | grams | 150 |
| Urea | do | 20 |
| Formalin (containing 37% actual formaldehyde | ml | 100 |
| Water | grams | 1,340 |

The above products were heated for 60 minutes at 85° to 90° C. at a pH of 5 to 5.5, whereafter the pH was adjusted to 7 and the product heated for another 60 minutes within the same temperature range. The calculated solids content was 11.75%; the starch to urea-formaldehyde ratio was 75:20, and the molar ratio of formaldehyde to urea was 4:1. This product when tested at 7.5% additive with ordinary kettle stucco (calcium sulfate hemihydrate) was found to have a consistency of 67, which compared with the consistency of also 67 for the kettle stucco when used without the additive. This proves therefore that adding even as much as 7.5% of the additive did not increase the consistency of the kettle stucco.

From the above examples it will be evident that many advantages result from the use of the present invention because it enables the introduction into cast gypsum products of large amounts of a farinaceous derivative, in this case most likely a co-condensation product of such farinaceous material with urea and formaldehyde, without necessitating the introduction into the mixture of inordinate amounts of water.

Example XIII

Further advantages of the present invention will be made evident from the subjoined table in which are given various tests of an additive which latter was prepared as follows:

A 1000 gram batch of the additive of a 20% solids content was made as follows:

| | | |
|---|---|---|
| 75 fluidity starch | grams | 150 |
| Urea | do | 25 |
| Formalin (containing 37% actual formaldehyde | ml | 94 |
| Water | grams | 724 |

The hydrogen-ion concentration of this mixture was adjusted in the cold to a pH of 6 to 6.5, whereafter it was heated for 1½ hours at 85° to 90° C. The hydrogen-ion concentration was adjusted during the heating period to maintain it within the initial pH range, either sodium hydroxide or acetic acid being used, as hereinabove indicated. At the end of the cooking cycle the hydrogen-ion concentration was adjusted to 7.0±0.2, the material then being cooled to room temperature.

The tests were then made at a 10% additive as follows:

| | | |
|---|---|---|
| Alpha gypsum | grams | 90 |
| Additive solution | ml | 50 |
| Alum | gram | 1 |

The reason for using the alum was somewhat to accelerate the set.

In the resulting product the normal consistency as well as the set were determined, and there were also made 6 briquettes, 6 2'' cubes, and 2 slabs ⅜'' thick, 3'' wide, and 15'' long. These were all cast at an adjusted consistency of 42 cc., which was 2 cc. below the normal consistency of the particular batch of alpha gypsum employed for Example XIII, but 2 cc. above the consistency of the mixture with the additive. The reason for adopting this procedure was to enable accurate comparisons to be made.

The briquettes, cubes and slabs were allowed to dry at 110° F. for 10 days. After the 10 days, one half of these were immersed in water for 24 hours. The following tests were then made on these specimens, to-wit: Dry and re-wet impact strength, tensile strength, modulus of rupture, modulus of elasticity, internal hardness, and 24 hour water absorption. The results obtained are tabulated in the following table:

*Summary of results* [1]

| Test | | "Alpha Gypsum" (Control) | "Alpha Gypsum" + 10% Additive |
|---|---|---|---|
| Impact strength (gm. cm.) | Dry | 1,530 | 3,620 |
| | Re-wet | 3,200 | 7,000 |
| Tensile Strength (#/in.$^2$) | Dry | 522 | 1,140 |
| | Re-wet | 291 | 485 |
| Modulus of Rupture (#/in.$^2$) | Dry | 1,040 | 2,700 |
| | Re-wet | 795 | 686 |
| Modulus of Elasticity $\left(\frac{\#/in.^2}{10^6}\right)$ | Dry | 2.28 | 2.14 |
| | Re-wet | 0.93 | 0.34 |
| 24 hr. Water Absorption (percent) | Briquettes | 17.0 | 5.5 |
| | 2'' cubes | 17.1 | 4.6 |
| | ⅜'' x 3'' x 15'' slabs | 16.7 | 7.3 |

[1] All castings at 42 cc. consistency.

From the said table it will be at once apparent that the strength of the material is very greatly increased.

Attention is also directed to the greatly decreased water absorption which in general is reduced to about one-third to one-half of the original value.

While the process has been described in connection with the use of the additive in the form of a solution, it will of course be evident that a a dry product can also be eventuated by the following expedients. Thus the additive solution may be suitably dried so as to yield the reaction product of the farinaceous material, urea and formaldehyde in comminuted dry water-soluble form, so that it may be physically admixed with the calcined gypsum, as for example the alpha gypsum herein described.

In order to avoid the production of a dry powder which does not readily revert into solution upon mixing the material with water, the drying should be accomplished under conditions which will not produce an irreversible gel. Methods which suggest themselves for this purpose are spray drying, and particularly drying from the frozen state. Both of these methods of drying are now well developed, and in themselves present nothing new, and therefore the method of drying is not further described or claimed herein.

While starch has been disclosed as the preferred material in the above examples, it will be evident that equivalent farinaceous materials may be employed in its place. Such materials may include various modified starches, oxidized starches, acid-treated starches, farinaceous flours, and dextrines.

The invention has found particular applicability in the production of casting plasters which yield highly accurate casts of great strength and impact resistance.

It will be evident, however, that the co-condensation or reaction product can be produced as a separate dry powder and form of itself an article of commerce to be sold to users of gypsum plasters, who may admix any desired quantity thereof with calcined gypsum as needed.

Accordingly it is quite evident, however, that the preparation of the additive, the additive itself, and the plastic powder, as well as the setting products produced therefrom, are all part of the same fundamental invention, and consequently claims to all of these features are to be found herein.

I claim:

1. A calcined gypsum plaster composition comprising calcined gypsum and a farinaceous material from the group consisting of starches and dextrines which has been reacted with urea and with an amount of formaldehyde in excess of two mols thereof for each mol of said urea.

2. A reinforced set plaster product, having a density not substantially less than the density characteristic of that plaster when cast neat at its normal consistency, which comprises set gypsum plaster and a farinaceous material from the group consisting of starches and dextrines which has been reacted with urea and with an amount of formaldehyde in excess of two mols thereof for each mol of said urea.

3. A calcined gypsum plaster composition comprising calcined gypsum and a starch which has been reacted with urea and with an amount of formaldehyde in excess of two mols thereof for each mol of said urea.

4. A reinforced set plaster product, having a density not substantially less than the density characteristic of that plaster when cast neat at its normal consistency, which comprises set gypsum plaster and a starch that has been reacted with urea and with an amount of formaldehyde in excess of two mols thereof for each mol of said urea.

JOHN K. WISE.

REFERENCES CITED

The following references are of record in the file of this patent:

UNITED STATES PATENTS

| Number | Name | Date |
|---|---|---|
| 2,152,670 | Shutt | Apr. 4, 1939 |
| 2,212,314 | Bauer | Aug. 20, 1940 |
| 2,240,529 | Tyce | May 6, 1941 |
| 2,275,314 | Pierson | May 3, 1942 |
| 2,346,999 | Sanford | Apr. 18, 1944 |
| 2,450,377 | Kesler | Sept. 28, 1948 |

FOREIGN PATENTS

| Number | Country | Date |
|---|---|---|
| 506,553 | Great Britain | May 31, 1939 |
| 560,696 | Great Britain | Apr. 17, 1944 |